(12) United States Patent
Matsushita

(10) Patent No.: US 7,520,156 B2
(45) Date of Patent: Apr. 21, 2009

(54) CALIBRATION METHOD FOR A PARALLEL KINEMATIC MECHANISM MACHINE

(75) Inventor: Tetsuya Matsushita, Niwa-Gun (JP)

(73) Assignee: Okuma Corporation, Niwa-gun (JP)

( * ) Notice: Subject to any disclaimer, the term of this patent is extended or adjusted under 35 U.S.C. 154(b) by 272 days.

(21) Appl. No.: 11/413,490

(22) Filed: Apr. 28, 2006

(65) Prior Publication Data

US 2006/0254364 A1 Nov. 16, 2006

(30) Foreign Application Priority Data

May 16, 2005 (JP) ............................. 2005-143175

(51) Int. Cl.
*G01B 3/30* (2006.01)
(52) U.S. Cl. ..................................... 73/1.79
(58) Field of Classification Search ........................ None
See application file for complete search history.

(56) References Cited

U.S. PATENT DOCUMENTS 4,155,173 A * 5/1979 Sprandel ....................... 33/503
4,962,591 A * 10/1990 Zeller et al. ................... 33/502
7,171,320 B2 * 1/2007 Ogura et al. .................. 702/95
2007/0163136 A1 * 7/2007 Eaton ........................... 33/505

FOREIGN PATENT DOCUMENTS

JP 2002-096232 A1 4/2002
JP 2005-103720 A1 4/2005

* cited by examiner

*Primary Examiner*—Robert R Raevis
(74) *Attorney, Agent, or Firm*—Burr & Brown

(57) ABSTRACT

Kinematic parameters of a parallel kinematic machine can be estimated with high precision considering thermal displacement and error of a measuring device, in addition to deformation error caused by self-weight of each component. A DBB device is used when end effectors of a parallel kinematic mechanism machine are positioned at plural positions and in plural postures. In the DBB device, a plurality of support bars are provided with rigid balls on the both ends. One of the balls is fixed on a table and the other ball is provided with an end effector. The position, posture, and distance from a fixed position are measured and based on the measured value kinematic parameters are estimated. In estimating the kinematic parameters, any of deformation error caused by self-weight of each component, thermal displacement of each component, error of a measuring device are added for computation by linear approximation.

2 Claims, 3 Drawing Sheets

CALIBRATION METHOD FOR A PARALLEL KINEMATIC MECHANISM MACHINE

This application claims the benefit of Japanese Patent Application Number 2005-143175 filed on May 16, 2005, the entirety of which is incorporated by reference.

BACKGROUND OF THE INVENTION

1. Field of the Invention

The present invention relates to a method for correcting error of an end effector in an operating machinery such as a machine with a parallel kinematic mechanism and a robot.

2. Description of the Related Art

In an operating machinery such as a machine and a robot, it is difficult to eliminate geometrical error when a position and a posture of an end effector such as a main spindle, a tool, and a hand, are controlled. In order to deal with this, a method is proposed which corrects error by calibrating kinematic parameters. As a calibration method, there is a so-called Double Ball Bar(DBB) measuring method, where displacement of a support bar with balls attached at the both ends is measured and error of the kinematic parameters is estimated from the measured value. (For example, Japanese patent publication of unexamined application No. 2005-103720.)

On the other hand, there is a problem that a measured value by the DBB measuring method includes error caused by factors other than kinematic parameters, so that it is impossible to accurately estimate the kinematic parameters. As a measure for this problem, there is proposed a method for eliminating deformation error caused by self-weight of the component by calibrating compliance of each component of a machine and calibrating kinematic parameters at the same time. With this method, geometric accuracy of motion of the end effector is improved. (For example, Japanese patent publication of unexamined application No. 2002-96232.)

However, when the DBB measuring method disclosed in Japanese patent publication of unexamined application No. 2005-103720 is applied to a parallel kinematic mechanism machine, DBB measuring at plural positions is required, whereby a supporting unit with a fixed ball needs to be attached and detached repeatedly. Consequently, it takes time to attach and detach the supporting unit. Moreover, there is a problem that a precise calibration is impossible because of various factors, for example, reproducibility in repeated attachment and detachment, and thermal displacement of a machine accompanied by environmental temperature change due to elapsed time.

In addition, a measured value obtained by DBB measuring includes thermal displacement of components, error of the DBB bar length, and error of the ball diameter other than the deformation error caused by self-weight of the component of the machine. Therefore, taking into consideration deformation error caused by self-weight of the component only is not sufficient to estimate the kinematic parameters precisely.

In view of the above problems, an object of the present invention is to improve geometric accuracy of motion of the end effector by precisely estimating kinematic parameters for a parallel kinematic machine with the above errors being considered, which are, thermal displacement and error of a measuring device other than deformation error caused by self-weight of the component of the machine.

SUMMARY OF THE INVENTION

In order to solve the above problems, the invention according to a first aspect provides a calibration method for a parallel kinematic mechanism machine comprising the steps of:

positioning an end effector of the parallel kinematic mechanism machine at plural positions and in plural postures;

measuring the position and/or posture or distance from a fixed position, and performing calibration by estimating kinematic parameters of the machine based on the measured value, wherein deformation error caused by self-weight of each component of the machine, thermal displacement of each component, and error of a measuring device are added for computation in estimating the kinematic parameters.

According to this method, since error factors other than kinematic parameters, for example, deformation error caused by self-weight, thermal displacement, and error of a measuring device, are added for computation, calibration can be performed by precisely estimating the kinematic parameters. As a result, geometric accuracy of motion of the end effector can be improved.

The invention according to a second aspect is related to a calibration method for a parallel kinematic mechanism machine according to the first aspect, wherein, estimating the kinematic parameters are performed by using a ball plate that has a plurality of columns erected on a base plate and balls disposed at the top of the columns, and the estimating comprises the steps of:

positioning an end effector at plural positions and in plural postures with respect to the ball as a fulcrum, wherein, the coordinate data of the center of the ball is a known value, and measuring the distance between the ball and the end effector.

According to this method, by using a ball plate as a jig, reproduction error due to attachment and detachment of components can be completely eliminated and the working time therefor is unnecessary. As a result, calibration can be performed in a short time with high precision.

According to the present invention, since error factors other than kinematic parameters, for example, deformation error caused by self-weight, thermal displacement of each component, and error of a measuring device, are added for computation, calibration can be performed by precisely estimating the kinematic parameters. As a result, geometric accuracy of motion of the end effector can be improved.

In addition, by using a ball plate, reproduction error due to attachment and detachment of the supporting unit can be completely eliminated and the working time therefor is unnecessary. As a result, calibration can be performed in a short time with high precision.

DETAILED DESCRIPTION OF THE PRESENT INVENTION

Figure 1:
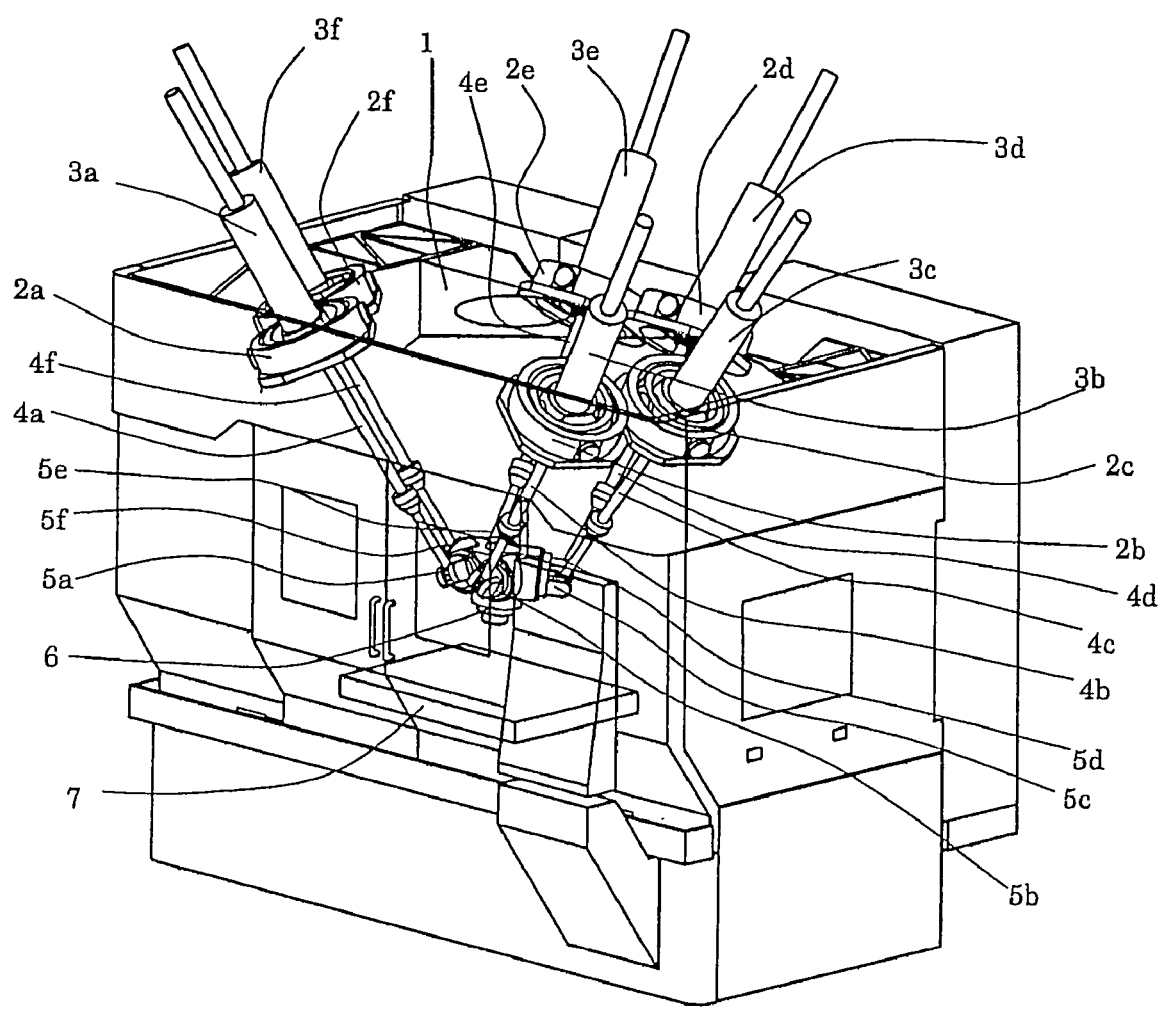
FIG. 1 is a perspective view of a parallel kinematic mechanism machine controlled with kinematic parameters estimated by calibration method of the present invention.

Hereinafter, the preferred embodiment of the present invention will be explained in detail with reference to the drawings. FIG. 1 shows a Stewart-platform parallel kinematic mechanism machine tool with six degrees of freedom, which is one of parallel kinematic mechanism machines. The parallel kinematic mechanism machine tool comprises a frame 1 fixed on a floor, six first universal joints 2a to 2f attached to the frame 1, servomotors 3a to 3f connected to first universal joints 2a to 2f respectively, ball screws 4a to 4f driven respectively by the servomotors 3a to 3f, second universal joints 5a to 5f connected to the lower ends of ball screws 4a to 4f respectively, one end effector 6 having second universal joints 5a to 5f, a table 7 fixed on the frame 1 on the opposite side of the end effector 6.

Figure 2:
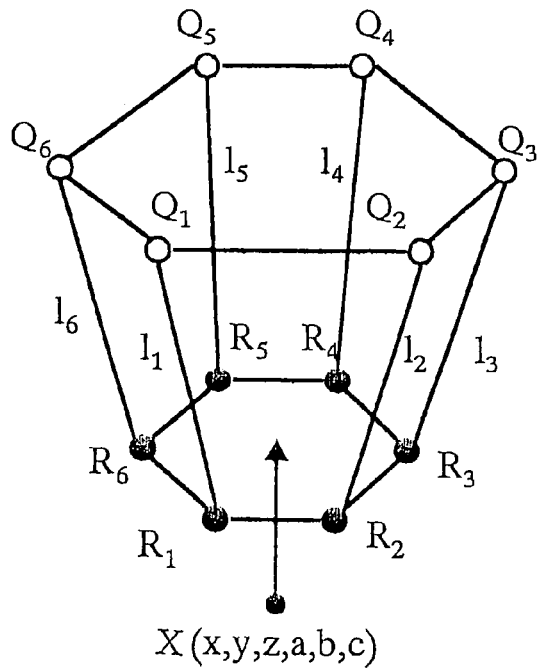
FIG. 2 is a view showing a frame format of a parallel kinematic mechanism.

As shown in a frame format of FIG. 2, there are 42 parameters as kinematic parameters, which are, positions of rotating center of base joints Q1-Q6 and end effector joints R1-R6, and a standard length of struts 11-16. Here, since the end effector 6 is relatively small and it is possible to measure the positions of rotating center of the end effector joints R1-R6 by a three coordinate measuring machine, the end effector is hot a subject of calibration and 24 kinematic parameters are subjects of calibration.

Figure 3:
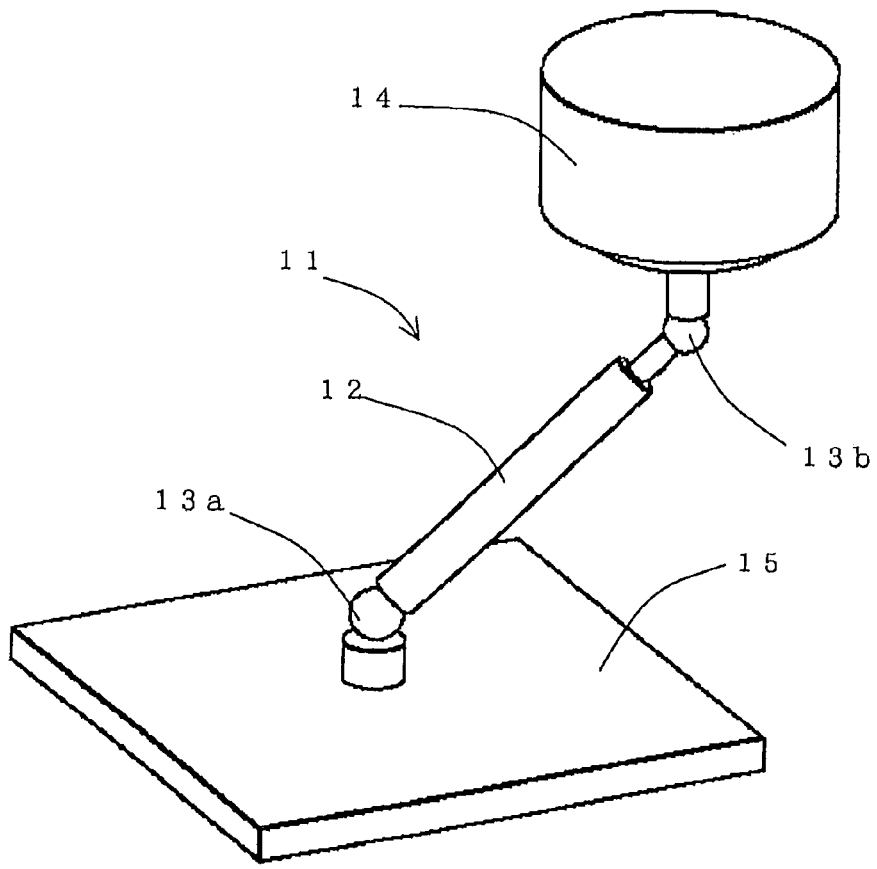
FIG. 3 is an explanation drawing of a DBB device.

FIG. 3 is an explanatory view of a Double Ball Bar (DBB) device. A DBB 11 has a telescopic support bar 12 with a measuring device and rotatable balls 13a, 13b mounted on the both ends of the support bar. One ball 13a is attached on a table 15 and the other ball 13b is attached to an end effector 14.

With this DBB device as configured above, the end effector 14 is positioned on plural arc motions or arc trajectories, a distance between center of two balls 13a, 13b is measured, and kinematic parameter errors are estimated based on the measured value.

Hereinafter, the computation method for estimation will be explained. When n units of kinematic parameters are set as described in Equation 1, the relationship between the kinematic parameters and a distance r between center of two balls 13a, 13b in DBB measuring is expressed by the following Equation 2.

$$P=[p_1,\ldots,p_n]^t \quad \text{[Equation 1]}$$

$$r_i=f(P,X_i) \quad \text{[Equation 2]}$$

Wherein, f is a function of forward kinematics, and $X_i$ represents a command value of position and posture of the end effector 14 as well as i th value in DBB measuring data. From Equation 1, error $\Delta P$ of kinematic parameters is expressed by Equation 3.

$$\Delta P=[\Delta p_1,\ldots,\Delta p_n]^t \quad \text{[Equation 3]}$$

The relationship between the error $\Delta P$ of kinematic parameters and DBB measured value $\Delta r$ is expressed by Equation 4 by linear approximation.

$$\Delta r_i = \sum_{j=1}^{n} \frac{\partial f_i}{\partial p_j} \Delta p_j \quad \text{[Equation 4]}$$

Actually, there are existing errors other than kinematic parameters, such as deformation error caused by self-weight of each component, thermal displacement, and error of a measuring device. These errors other than kinematic parameters are taken into consideration as $\Delta e$ by linear approximation, whereby the DBB measured value $\Delta r$ is expressed by the following Equation 5.

$$\Delta r_i = \sum_{j=1}^{n} \frac{\partial f_i}{\partial p_j} \Delta p_j + \Delta e_i \quad \text{[Equation 5]}$$

Here, errors $\Delta e$ other than kinematic parameters are considered. Deformation amount by self-weight of each component can be obtained by a method disclosed in Japanese patent publication of unexamined application No. 2003-430628, and when forward kinematics calculation is performed based on this deformation amount, deformation error can be obtained as a part of $\Delta e$. In other words, since deformation error caused by self-weight of each component may be regarded as a part of error $\Delta P_{Gi}$ of kinematic parameters, errors $\Delta e$ other than kinematic parameters can be expressed by the following Equation 6.

$$\Delta e_i=f(P+\Delta P_{Gi},X_i) \quad \text{[Equation 6]}$$

In addition, since thermal displacement can be regarded as an error other than kinematic parameters error, it can be obtained as a part of $\Delta e$ by forward kinematics calculation. For example, when a material different from the other member is used as a part of the end effector, error $\Delta P_T$ of thermal displacement of rotating center of end effector joints R1-R6 is generated because of difference of coefficient of linear thermal expansion, dimension of a component of the end effector 6, and room temperature (a temperature of a machine body). This error $\Delta P_T$ is expressed by the following Equation 7.

$$\Delta P_T=\alpha T \quad \text{[Equation 7]}$$

Wherein, T is a vector of temperature of the machine body and $\alpha$ is a matrix coefficient found by difference of linear thermal expansion coefficient and dimension of a component. Therefore, errors $\Delta e$ other than kinematic parameters can be expressed by the following Equation 8 by using error $\Delta P_T$ of other than kinematic parameters due to thermal displacement. Errors of other than kinematic parameters due to thermal displacement can be similarly treated.

$$\Delta e_i=f(P+\Delta P_{Ti},X_i) \quad \text{[Equation 8]}$$

On the other hand, a distance between center of two balls in DBB is obtained by calibration using a calibrator. The calibrator has two spherical seats made of material whose linear thermal expansion coefficient is substantially 0 and the distance between center of two balls is previously measured to be a known value. The length of the DBB bar is compensated based on the coefficient of linear thermal expansion of a machine, and room temperature or a temperature of a machine body. If there is an error in setting the temperature of the machine body, the DBB length includes error $\Delta r_{DBB}$. When DBB measuring is performed under this condition, the measured value could include an error. The same can be said for the diameter of the ball including an error $\Delta r_{Ball}$, and the error can be treated as a part of $\Delta e$ as shown in Equation 9.

$$\Delta e_i=\Delta r_{DBB}+\Delta r_{Ball} \quad \text{[Equation 9]}$$

It should be noted that the errors $\Delta e$ caused by factors other than the kinematic parameters can be computed simultaneously. Moreover, after DBB measurement these errors can be computed again with modification.

In DBB measurement, m units of positional data can be obtained in different positions and postures. Consequently, m units of Equations 5 are obtained, whereby Equation 10 can be expressed as follows.

$$\Delta R=A\cdot\Delta P \quad \text{[Equation 10]}$$

Wherein, ΔR, A can be set in a matrix shown in Equation 11.

$$\Delta R = \begin{bmatrix} \Delta r_1 - \Delta e \\ \vdots \\ \vdots \\ \Delta r_m - \Delta e_m \end{bmatrix},$$

[Equation 11]

$$A = \begin{bmatrix} \frac{\partial f_1}{\partial p_1} & \cdots & \frac{\partial f_1}{\partial p_n} \\ \vdots & & \vdots \\ \frac{\partial f_m}{\partial p_1} & \cdots & \frac{\partial f_m}{\partial p_n} \end{bmatrix}$$

By solving this Equation 11 with least-square method, the error ΔP of kinematic parameters can be obtained as shown in Equation 12.

$$\Delta P = (A^t A)^{-1} A^t \cdot \Delta R$$

[Equation 12]

As described above, the errors Δe other than kinematic parameters shown in Equation 5 are a sum of Equations 6, 8, and 9. Moreover, if an error due to another factor occurs, a new error factor can be incorporated into the above sum.

In this way, since error factors other than the kinematic parameters, such as deformation error caused by self-weight, thermal displacement, and error of a measuring device, can be taken into consideration, calibration can be performed by precisely estimating the kinematic parameters. The detected error ΔP of kinematic parameters is added to the original kinematic parameters P to rewrite the parameter within a NC machine, whereby geometric accuracy of motion of the end effector is improved.

In the above embodiment, since the error is small the kinematic parameters of the end effector 6 are omitted from an object of calibration. However, all of the 42 kinematic parameters may be objects of calibration without omission of the kinematic parameters of the end effector 6.

Figure 4:
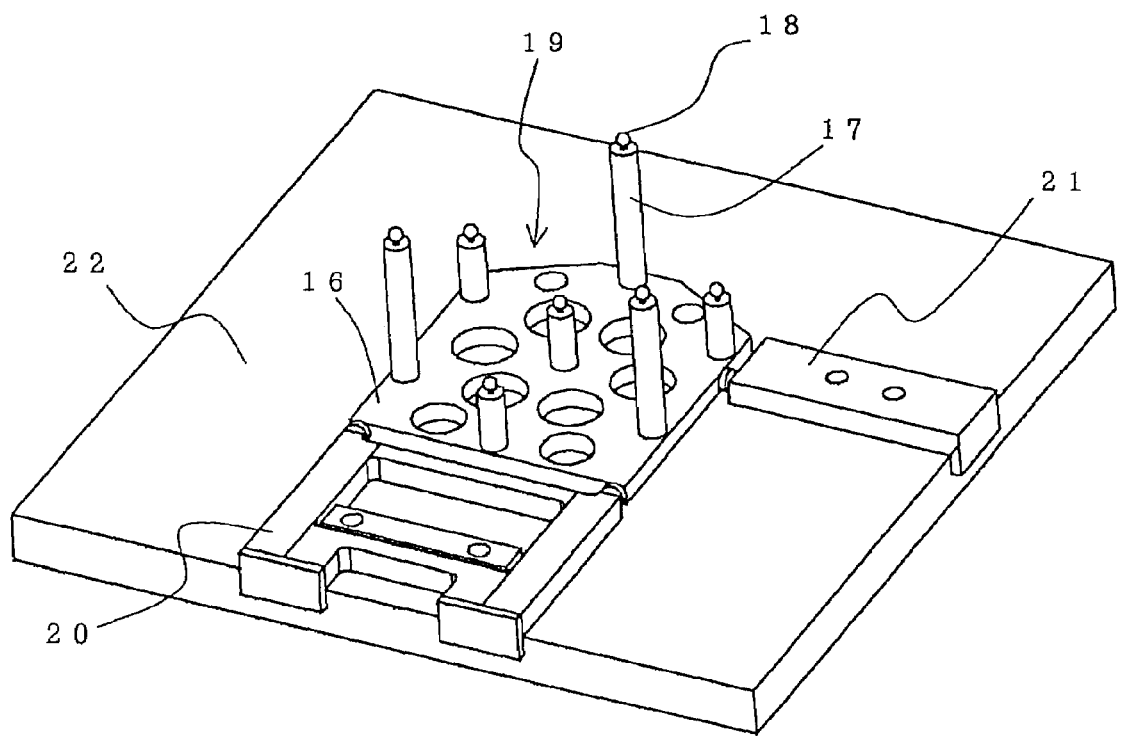
FIG. 4 is an explanatory perspective view of a DBB measuring jig.

Next, a jig used for DBB measuring will be explained. FIG. 4 shows a perspective view of the jig which includes a ball plate 19, a first stopper 20 (at the front), and a second stopper 21 (on the right side). The ball plate 19 has a plurality of struts 17, 17 . . . erected on a base 16 and at the top of the strut 17 a rigid ball 18 is disposed. The ball plate 19, the first stopper 20, and the second stopper 21 are disposed on a table 22.

The first stopper 20 includes two parallel sides, and one side is attached to the side (the front side) of the table 22 to be fixed thereon. By doing this, the first stopper 20 has a side parallel to the table 22, so that the ball plate 19 can be disposed parallel to the side of the table 22 when it is attached to the first stopper 20. On the other hand, the second stopper 21 is attached and fixed to the right side of the table 22. The ball plate 19 can be disposed on the right side of the table 22 with a predetermined distance when it is attached to the second stopper 21.

In the ball plate 19, the coordinate data of the center of the rigid ball 18 is measured by a three coordinate measuring machine. By doing this, the coordinate data of the center of the rigid balls 18, 18 . . . with respect to the table 22 is determined respectively. As a result, the coordinate data on the table coordinate system becomes a known value.

The rigid ball 18 is disposed so that DBB and the rigid ball 18 or the strut 17 do not interfere with each other. In addition, in order to enhance measuring accuracy with respect to the table 22, there is a difference of height between rigid balls 18, 18 . . . in the vertical direction (the vertical direction of the table).

In the ball plate 19 configured in this manner and in which the coordinate data of the rigid ball 18 is a known value, DBB measuring is performed by setting the rigid ball 18 as the fixed end ball (a ball 13*a*). Here, the support bar 12 of the DBB is inclined in order to enhance measuring accuracy in the vertical direction of the table 22.

Figure 5:
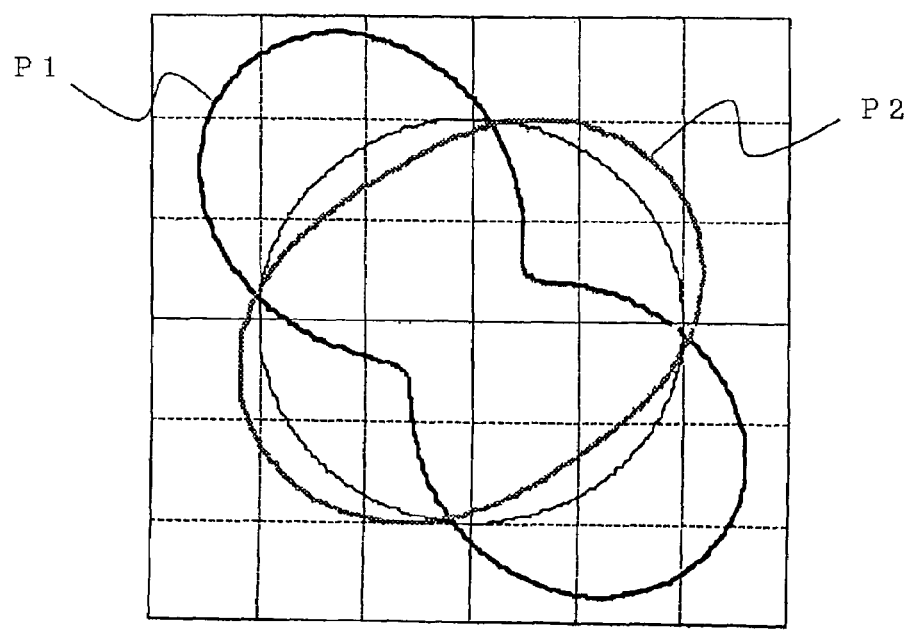
FIG. 5 is an explanatory drawing of measurements on circularity by DBB method with the present invention applied or not applied to the parallel kinematic mechanism machine in FIG. 1.

As described above, an arc trajectory around the known data in the table coordinate system is obtained and kinematic parameters with respect to the table 22 is determined. As a result, 24 kinematic parameters can be calibrated. FIG. 5 shows a result of DBB measuring after calibration, where P1 shows a trajectory without taking deformation error caused by self-weight into consideration, and P2 shows one taking it into consideration. It can be confirmed from this figure that circularity has been improved by taking deformation error caused by self-weight into consideration.

In this way, by using a ball plate as a jig for measuring the distance, reproduction error due to attachment and detachment of components can be completely eliminated and the working time therefor is unnecessary. As a result, calibration can be performed in a short time with high precision.

What is claimed is:

1. A calibration method for a parallel kinematic mechanism machine comprising the steps of:
    positioning an end effector of the parallel kinematic mechanism machine at a plurality of positions and postures;
    measuring at least one of the position and posture, or distance of the end effector from a fixed position at each of the plurality of positions and postures of the end effector, and
    performing calibration by estimating kinematic parameters of the machine based on the measured values,
    wherein any of deformation error caused by self-weight of each component of the machine, thermal displacement of each component, and error of a measuring device is added for computation in estimating the kinematic parameters.

2. A calibration method for a parallel kinematic mechanism machine according to claim 1, wherein estimating the kinematic parameters is performed using a ball plate which has a plurality of columns erected on a base plate and rigid balls disposed at the top of the columns, and the estimating comprises the steps of:
    measuring coordinate data of the center of each of the rigid balls as a known value;
    positioning the end effector at a plurality of positions and postures in a coordinate system determined with respect to the coordinate data of the center of each of the rigid balls; and
    measuring the distance between the end effector and each of the rigid balls.

* * * * *